United States Patent [19]

Sebring

[11] 4,267,630
[45] May 19, 1981

[54] METHOD OF FABRICATION OF CORELESS HOLLOW FILAMENT SEPARATORY MODULE

[75] Inventor: Robert E. Sebring, Westwood, Mass.

[73] Assignee: Albany International Corp., Menands, N.Y.

[21] Appl. No.: 52,861

[22] Filed: Jun. 28, 1979

[51] Int. Cl.³ .............................................. B23P 17/00
[52] U.S. Cl. ........................................ 29/411; 29/412; 29/526 R; 242/53; 242/18 G
[58] Field of Search ..................... 29/157 R, 411, 412, 29/526 R; 210/321 R, 321 B, 321.5, 22; 242/18 G, 53

[56] References Cited

U.S. PATENT DOCUMENTS

| | | | |
|---|---|---|---|
| 3,419,925 | 1/1969 | Scroggie et al. | 242/53 UX |
| 3,422,008 | 1/1969 | McLain | 210/22 |
| 3,506,420 | 4/1970 | Jackson et al. | 242/18 G X |
| 4,045,851 | 9/1977 | Ashare | 290/157 R |
| 4,177,957 | 12/1979 | Lucke | 242/53 |

*Primary Examiner*—Charlie T. Moon
*Attorney, Agent or Firm*—Kane, Dalsimer, Kane, Sullivan & Kurucz

[57] ABSTRACT

Method of manufacturing a coreless separatory module utilizing a drum with outwardly projecting vanes having tips spaced greater than the desired length of ultimate bundle and after winding, sliding the bundle axially of the drum and cutting between vanes to produce the desired length.

6 Claims, 5 Drawing Figures

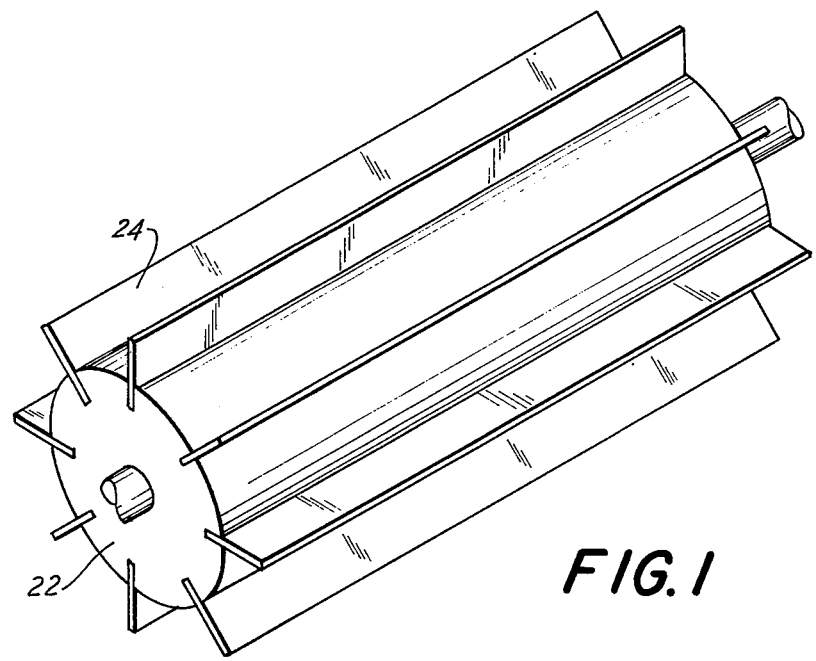
FIG. 1
FIG. 2A
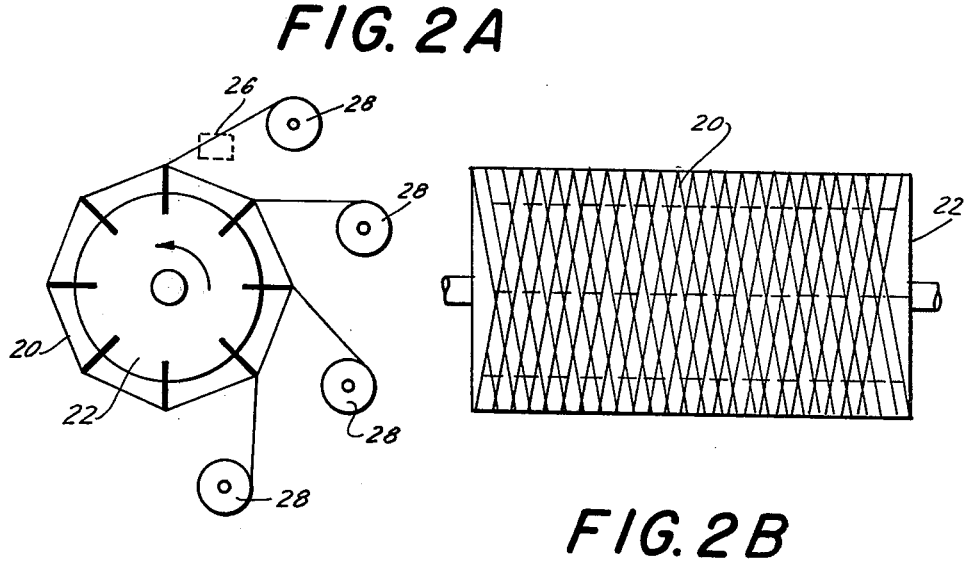
FIG. 2B

METHOD OF FABRICATION OF CORELESS HOLLOW FILAMENT SEPARATORY MODULE

BACKGROUND OF THE INVENTION

The use of hollow monofilaments in connection with reverse osmosis and other separation and purification procedures is old and well known as shown in U.S. Pat. No. 3,422,008, issued Jan. 14, 1969, to Dow Chemical Company, and as shown in report PB233,102 of the Monsanto Research Corporation, dated September, 1973, to the U.S. Department of the Interior.

Permeable wall hollow filaments for installation in a fluid separatory module must be arranged in a bundle and sealed in a tube sheet at one or both ends. A bundle of straight parallel filaments promotes inefficiencies in the separatory process, and conversely a bundle comprising criss-crossed filaments with an even distribution of connected tortuous voids between the filaments can promote the separating efficiency.

A variety of methods is known to prepare the filament bundle assemblage. Many of these are intricate and many involve complex steps of winding with special machinery and utilization of porous sheets which act as support members.

In a module, a properly assembled multifilament array must meet a number of specifications. Among these is a geometric arrangement which provides a fairly high packing density and which at the same time minimizes channeling of the feed fluid as it passes among the filaments. Therefore, some method of keeping filaments from packing densely in certain areas and loosely in others is desirable. In other words, packing density of the filament array should be both very uniform and in the order of about 25% to 60%, if some of the main advantages of the use of hollow filaments are to be achieved. In view of these considerations the use of various filament assembly techniques is frequently unattractive.

An advantageous geometry to attain the desired result has been described in U.S. Pat. No. 4,045,851, as comprising an annular bundle of hollow filaments wound in a plurality of layers at a selected helix angle with alternate layers being of opposite helix direction. Further benefits of having helical intermeshing orientation of filaments to one another is shown in U.S. Pat. No. 4,105,548, where a three-dimensional network in spiral wound structure of hollow filaments in multiple layers is described. In both these methods, however, the helical structure is achieved by winding the filaments on a mandrel, resulting thereafter in the formation of an annular bundle of filaments.

While these methods provide the relatively uniform fine pore distribution of spaces among the filaments desired, in both cases the preparation of an annular bundle tends to offset some of the desired advantages of the use of a multi-filament membrane system. First, the presence of a core element filling the central region of the annular bundle tends to reduce the effective total membrane surface area attainable within the operating module of which the filaments are a part. Second, the preparation of an annular bundle by wrapping fibers helically upon a core or mandrel element inherently limits the steepness of the helix to that attainable without undue slippage restrained only by resistance due to fiber on fiber. It would be desirable to provide helically wound fibers in bundles absent a central core and at extremely steep helix angles for some applications. This can be achieved to some limited extent by methods contemplated in the cited U.S. Pat. No. 4,045,851. There nevertheless remains some residue of a hollow central region by the method described in that patent and it is therefore of advantage to pursue alternate methods to attain the desired result.

SUMMARY OF THE INVENTION

A filament separatory module in which the module is a coreless substantially cylindrical bundle of thread-like small diameter hollow bore filaments disposed in spaced relationship over the major portion of length and sealed at the ends into common manifolds and in which the method of fabrication comprises the steps of providing a drum with a plurality of radially outwardly extending vanes spaced so that the tangential distances between tips is substantially equal to or greater then the desired length of ultimate filament bundle, winding the filament about the vanes by relative motion between the drum and the filament being wound to provide a pattern of left and right hand helices with multiple crossover points formed.

BRIEF DESCRIPTION OF THE DRAWINGS

In the accompanying drawings:

FIG. 1 is a perspective view of the winding drum used in the bundle winding procedure in accordance with the teachings of this invention.

FIGS. 2A and 2B are diagrammatic views illustrating filaments being wound on the drum of FIG. 1 in the practive of the invention;

DESCRIPTION OF THE PREFERRED EMBODIMENT

Figure 3:
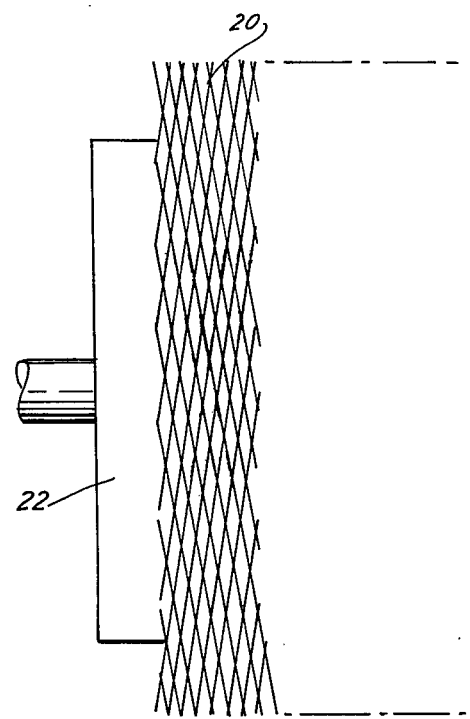
FIG. 3 illustrates a step after winding.

The principal element of the winding machine used in the practice of the method taught herein is a large rotatable drum. In the Figs. the bundle in the process of being wound is indicated by the numeral 20 while the drum is indicated by the numeral 22. The drum has longitudinal vanes 24. The size of the drum is such that the tangential distance between the tips of adjacent vanes 23 is equal to or slightly greater than the desired length of the filament bundle.

The drum is rotated around its own axis and a supply of hollow filament yarns from one or more supply packages are wound helically around the radial spokes 24. A traversing mechanism 26 is provided so that alternating layers of windings traverse in opposite directions, and create a winding pattern with a multiplicity of yarn crossovers.

Filaments are wound onto the rotating drum as shown in FIGS. 2A and 2B. There can be multiple supply packages 28 of hollow fils, in order to shorten the time necessary to wind on the required number of turns. The winding pattern must also provide a level wind traverse, so that a pattern of left and right hand helices, with multiple crossovers is created as shown in FIG. 2B.

Figure 4:
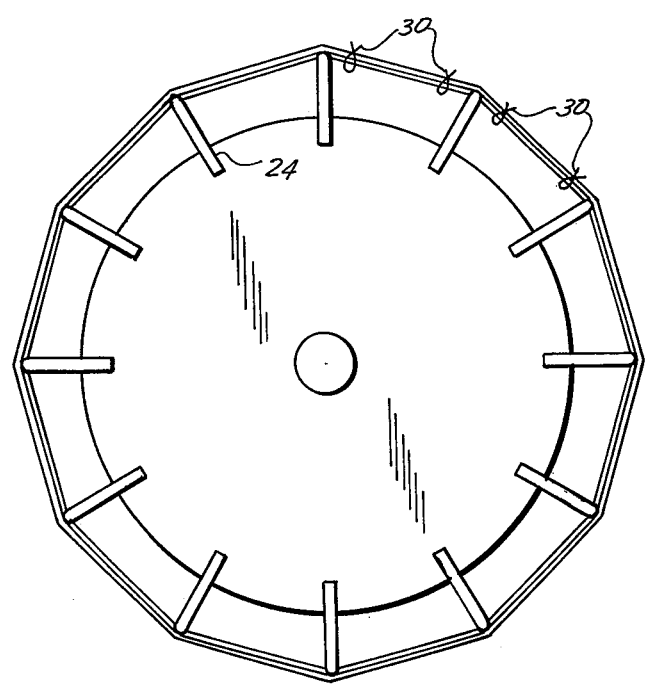
FIG. 4 is a diagrammatic view illustrating the turns being "roped" together.

When the required number of turns have been applied, they are roped together, by sliding axially along the drum as shown in FIGS. 3 and 4. This step can be made easier if there is a provision for retracting the blades 24 to reduce their diameter slightly, or if they are tapered toward one end, with a slightly smaller diameter at one end of the drum than at the other. In this step, the necessary crossover points of the helical winds will trellis, and the winding will assume a uniform packing density without parallel channels through the bundle. Exact geometry of the bundle will be dependent on the width of traverse before roping which is shown in FIG. 4 on the pitch of the helical winding, on the width of the bundle after roping together, and on the winding speed.

As an alternative to roping the bundle of fibers together, which would reduce the helix angle and tend to straighten the bundle, they might be rolled up on the drum. This would prevent trellising of the fiber crossover points, and preserve a more distinctly interlaced pattern in the bundle shape.

The bundle is tied or bound together at places 30 between the vanes, and then individual segments of the bundle are cut off the winding drum, and are ready for potting the end seals, or other necessary processing steps. The cross-section of the bundle segments can be manipulated to provide a nearly circular or rectangular bundle as may be necessary for the end use application.

With the bundle built up to the desired final diameter, it can be inserted in a cylindrical chamber and sealed to provide a completed cartridge.

I claim:

1. The method of fabricating a coreless filament separatory module comprising the steps of providing a drum with a plurality of radially outwardly projecting vanes extending axially of the drum and spaced so that the tangential distance between tips of the vanes is substantially equal to or greater than the desired length of ultimate filament bundle, winding the filament about the vanes by relative motion between the drum and the filament being wound to provide a pattern of left and right hand helices with multiple crossover points formed and in which the bundle is thereafter slid axially of said drum and the turns roped together at spaced points thereby trellising the crossover points and segments of the bundle are tied and cut between the vanes to produce the desired length bundle.

2. The method of fabrication in accordance with claim 1 in which the turns are rolled up on the drum and then segments of the bundle are tied and cut off the drum.

3. The method in accordance with claim 1 in which the vanes are retractable for moving the bundle axial of the drum after winding.

4. The method in accordance with claim 2 in which the vanes are retractable for moving the bundle axial of the drum after winding.

5. The method in accordance with claim 1 in which the vanes are tapered in their radial projection from the drum toward one end of the drum for moving the bundle axial of the drum after winding.

6. The method in accordance with claim 2 in which the vanes are tapered in their radial projection from the drum toward one end of the drum for moving the bundle axial of the drum after winding.

* * * * *